May 14, 1935. T. V. DILLSTRÖM 2,001,456
INTERNAL COMBUSTION ENGINE
Filed Sept. 27, 1932   2 Sheets-Sheet 1
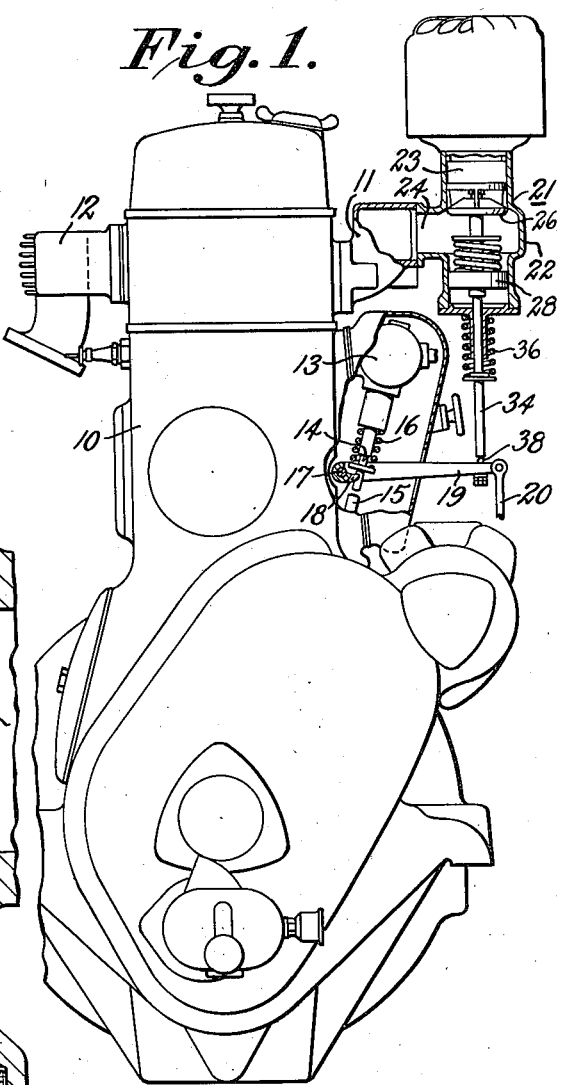
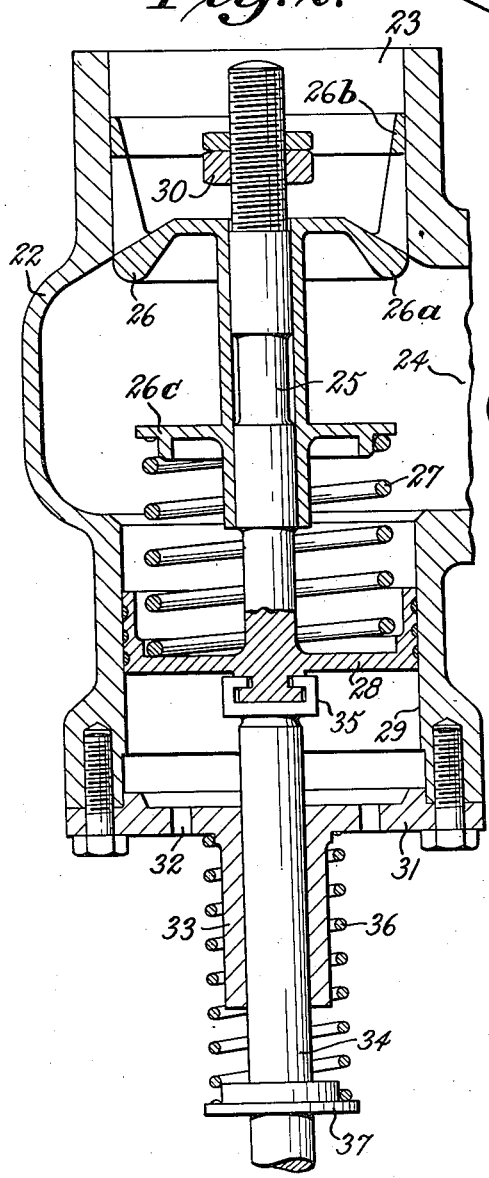
INVENTOR
Torbjörn Viktor Dillström
BY
Wm. T. Hedlund
his ATTORNEY May 14, 1935. T. V. DILLSTRÖM 2,001,456
INTERNAL COMBUSTION ENGINE
Filed Sept. 27, 1932 2 Sheets-Sheet 2
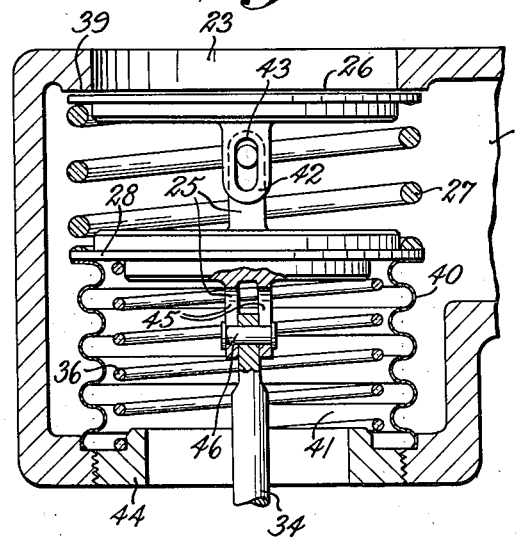
INVENTOR
Torbjörn Viktor Dillström
BY
Wm T. Hedlund
his ATTORNEY Patented May 14, 1935

2,001,456

UNITED STATES PATENT OFFICE 2,001,456

INTERNAL COMBUSTION ENGINE

Torbjörn Viktor Dillström, Stockholm, Sweden, assignor to Hesselman Motor Corporation, Ltd., London, England, a corporation of Great Britain Application September 27, 1932, Serial No. 635,003 In Germany October 5, 1931

21 Claims. (Cl. 123—139)

The present invention relates to internal combustion engines and has particular reference to valves for controlling the supply of air for combustion to such engines. Still more particularly, the invention relates to air control valves for internal combustion engines of the solid injection type.

In order to secure sufficient delicacy of control of the air supply when it is desired to deliver to the combustion chamber or chambers of the engine definite charges of air corresponding to the charges of fuel supplied in accordance with variations in load, it is desirable to use an adjustable spring loaded valve, since the ordinary throttle valve is not suitable for this purpose. The changes made in the amount of fuel supplied to an engine are often relatively slight and often occur with considerable frequency and in order for the air control valve to make the proper correspondingly slight and frequent changes necessitated by changes in the amount of fuel supplied, this valve must be substantially free from lag or suggishness of action induced by friction forces opposing movement of the valve. Consequently the loading spring for the valve must be relatively powerful. On the other hand, the force required to actuate the valve regulating mechanism should be as small as possible and to this end the loading spring should not exert any force on the regulating mechanism. It is particularly important that the requirements of a relatively heavily loaded, highly sensitive air valve and a regulating mechanism independent of any force derived from the spring load on the valve be met when such a valve is employed as a throttle valve, for example in the case of engines for motor vehicles, and the valve regulating mechanism is actuated by means of the usual manually operable accelerator pedal.

In order to reduce the force exerted by a valve loading spring on valve regulating mechanism it has heretofore been proposed to employ spring loaded air control valves which are partially balanced. With such valves the strength of the loading spring may be relatively slight since the spring must act only against the unbalanced area of the valve, which is ordinarily but a small fraction of the total valve area. Such an arrangement, however, involves two disadvantages. In the first place, the valve is only partially balanced and a certain amount of force due to such unbalance is transmitted to the regulating mechanism. In the second place, the relatively light spring load required to move the partially balanced valve is insufficient to move the valve with sufficient positiveness and rapidity of action against the unavoidable friction forces opposing movement of the valve.

A principal object of the present invention is to provide apparatus of the character described comprising a spring loaded air valve in which a relatively heavy loading spring may be employed to secure rapid and accurate movement of the valve while at the same time not subjecting the regulating mechanism for the valve to forces of undesirable magnitude derived from the loading spring or from any other part of the device and tending to increase the effort required to actuate the regulating mechanism. The more specific objects and nature of the invention together with the advantages to be derived from its use will appear more fully in conjunction with the ensuing description of several suitable forms of apparatus for carrying the invention into effect, reference being had to the accompanying drawings in which:

Fig. 1 is a front elevation, partly in section, of a solid injection internal combustion engine comprising apparatus embodying the invention;

Fig. 2 is a vertical central section on a larger scale of the valve shown in Fig. 1;

Fig. 3 is a section similar to Fig. 2 of another form of valve;

Fig. 4 is a section similar to Fig. 2 of still another form of valve;

Fig. 5 is a view similar to Fig. 2 of still another form of valve; and

Fig. 6 is a view showing a part of the structure of Fig. 5 viewed at right angles to Fig. 5.

Referring now to Fig. 1, reference numeral 10 designates the cylinder block of an internal combustion engine to the cylinders of which (not shown) air for combustion is admitted through the induction pipe 11 and from which combustion gases are exhausted through the exhaust manifold 12. Fuel is injected to each of the cylinders by a fuel pump, there being one pump for each cylinder and one of the pumps being indicated generally at 13. In the embodiment illustrated, the pump 13 is of the plunger type comprising a plunger 14 adapted to be moved on its discharge stroke by a tappet 15 actuated from any suitable shaft or other moving part within the engine and actuated on its suction stroke by the spring 16. Adjacent to the lower end of plunger 14 there is situated a rockshaft 17 having arms or fingers 18 attached thereto which are adapted to contact the pump plunger to limit the length of its suction stroke and thus control the amount of fuel discharged by the pump on its next succeeding discharge stroke. An arm 19 is fixed to shaft 17 for turning this shaft to alter the position of fingers 18 and thus control the amount of fuel injected for each discharge stroke of the pump, the pump having one discharge stroke for each working stroke of the cylinder. Arm 19 is connected to an accelerator pedal or other suitable control member through any suitable connecting means such as rod 20.

Admission of air to the induction pipe 11 is controlled by the air valve indicated generally at 21, which valve acts as a throttle valve. Valve 21 comprises a casing 22 (see also Fig. 2) having an inlet for air at 23 and an outlet for air at 24, said outlet being in communication with the induction pipe 11. Within the valve casing 22 is located the valve spindle 25 upon which is slidably mounted the reciprocable valve member 26. Valve member 26 comprises a plate-like closing portion 26a adapted to control the admission of air through inlet 23 and advantageously guided by an extension 26b sliding in the portion of the casing forming the air inlet passage. Spaced from the closing portion 26a is the valve retaining portion 26c against which abuts one end of the loading spring 27. The opposite end of the loading spring 27 abuts against a balancing member 28 which, in the embodiment illustrated, is in the form of a piston reciprocable in the cylinder 29 formed in the valve casing. Piston 28 is fixed to the valve spindle 25 and a nut 30 or like retaining member is screwed or otherwise fixed to the spindle 25 above the valve member. The nut 30 is adapted to provide some initial compression of the loading spring when the valve member is moved into contact therewith under the influence of the loading spring. The lower end of the valve casing is closed by a plate 31 having suitable openings 32 therethrough and having a bushing portion 33 providing a guide for the stem 34 which is attached at 35 to the spindle 25. The connection 35 is preferably of a type permitting some misalignment of stem 34 and spindle 25 without incurring binding of the reciprocable parts. The openings 32 in plate 31 provide communication between the lower end of cylinder 29 and the atmosphere so that the portion of this cylinder below the member 28 becomes a balancing chamber.

A relatively light retracting spring 36 is situated between the plate 31 and a collar 37 on stem 34. The lower end of stem 34 rests upon an adjusting screw 38 carried by the arm 19 and the retracting spring 36 insures contact between these parts.

The operation of the apparatus just described is as follows: When the engine is running the reduced pressure in the induction pipe and the valve casing causes the valve member to tend to move away from the valve inlet under the influence of the pressure of air outside of the valve, this pressure in the embodiment illustrated being atmospheric pressure. Opening movement of the valve member is resisted by the loading spring 27 which reacts against the balancing member 28. It will be observed, however, that the balancing member 28 is subject to the same external pressure as the valve member 26 and since the unbalanced areas of these two elements are equal the opposed forces acting to compress the loading spring will balance each other. In order to regulate the value of the force due to air pressure required to open the valve, the position of the balancing member is altered through the medium of the valve regulating mechanism comprising the arm 19 and stem 34. With the balancing member in any given position of adjustment, variations in engine speed will cause the valve member to open to a greater or lesser extent due to the variations in pressure on the two sides of the valve member caused by variations in engine speed. The valve is thus automatically responsive to variations in engine speed but regardless of the position of the valve member with respect to the inlet opening, and regardless of the degree to which the loading spring is compressed due to air pressure, the reaction of the loading spring is absorbed by means which prevent the transmission of any force due to the loading spring to the regulating mechanism. In Figs. 1 and 2 the valve is shown in a position where it is just about to open under the influence of air pressure which has moved the valve member away from the stop provided by the nut 30 and as will be evident from Fig. 2, the position of the balancing member 28 will determine the movement or stroke of the valve member away from the stop required to effect opening of the valve. It will further be evident that the greater the stroke required to open the valve, the greater will be the value of the force due to air pressure required to effect opening of the valve, so that as the balancing member is moved toward the air inlet the throttling effect of the valve will be increased.

It is to be observed in the embodiment illustrated that spacing of the spring retaining portion 26c from the closing portion 26a of the valve member permits the placing of the loading spring outside of the path for free flow of air from the inlet to the outlet of the casing, thus reducing unavoidable throttling losses to a minimum.

It is also to be observed that the unbalanced area of the valve closing portion 26a is equal to the full cross-sectional area of the valve. Thus, any given pressure difference between the pressure existing in the induction pipe and the pressure outside the valve will result in an opening force of relatively high value as compared with the opening force that would be exerted on a partially balanced valve of like dimensions. In order to close the valve, a correspondingly high value of force must be exerted by the loading spring 27 and due to the relatively high values of the opening and closing forces, the resistance to movement of the valve member due to friction becomes negligible.

In Fig. 3, another form of valve is illustrated in which the valve member 26 is adapted to close the inlet 23 of the valve casing by abutting against a seat 39 provided by the casing around the inlet 23. The valve member is closed by loading spring 27 which reacts against an abutment provided by the plate-like balancing member 28. Member 28 is connected to the lower portion of the valve casing by means of a bellows 40 or like expansible member which provides a balancing chamber 41 similar to the balancing chamber provided by the lower portion of cylinder 29 in the form of valve shown in Fig. 1. Valve member 26 and balancing member 28 are reciprocable relative to each other and are connected by means for limiting the maximum distance between these two members. In the embodiment illustrated this means comprises the valve spindle 25 on member 28 and slotted projections 42 on valve member 26, the spindle 25 carrying a pin 43 projecting into the slots. The arrangement illustrated provides a lost motion connection between the valve member and the balancing member. The retracting spring 36 is located in the balancing chamber 41, one end of the spring abutting against member 28 and the other end of the spring abutting against a suitable retaining ring 44 screwed into the bottom of the casing. The stem 34 comprising a part of the valve regulating mechanism is, in the illustrated embodiment, connected to the balancing member 28 by means of a lost motion connection comprising the slotted projections 45 on the lower face of member 28, into the slots of which the pin 46 carried by stem 34 projects.

In general the operation of this form of valve is similar to that already described. With the engine in operation, the difference in air pressure between atmospheric pressure at inlet 23 and the reduced suction pressure at outlet 24 acts on valve member 26 in a direction tending to open the valve. Opening of the valve under the influence of this pressure is resisted by the loading spring 27, the reaction of which spring is transmitted to the abutment formed by the balancing member 28. The under-face of member 28 is exposed to the same differential pressure as that acting upon the valve member 26. In the figure, the valve parts are shown in a position in which the loading spring is substantially compressed so that air passing to the induction pipe is throttled. Inasmuch as the valve mechanism comprising the valve member 26, balancing member 28 and loading spring 27 is balanced with respect to air pressure, this entire mechanism tends to move upwardly under the relatively slight force exerted by the retracting spring 36 and in order to secure additional throttling of the air entering the induction pipe, the regulating mechanism is moved so as to permit the stem 34 to move upwardly. This causes a greater force to be required in order to open the valve since upon upward movement of the balancing member 28 further compression of the loading spring 27 is required before the valve will open. If, for example, the engine is running with the air supply throttled, the valve mechanism being in the position shown in the figure, and the engine is stopped by turning off the ignition, the consequent rise in pressure in the induction pipe to substantially the same pressure as that existing outside of the valve will cause the balancing member 28 to be moved away from the valve member 26 to the extent permitted by the lost motion connection between these two members. The downward movement of the balancing member 28 under such conditions will, however, not tend to move the stem 34 because of the lost motion connection between this stem and the balancing member.

It will be evident that the form of valve just described is in its essential characteristics the same as that shown in Fig. 2, regulation of the valve being effected by adjusting the position of a balancing member which absorbs the reaction of the loading spring with respect to the inlet opening of the valve. In both forms of the valve the regulating mechanism is wholly independent of forces exerted by the loading spring, which spring, together with the valve member, is arranged for balanced displacement within the valve casing to vary the force required to open the valve. The form of valve shown in Fig. 3 differs slightly from that in Fig. 2 in that the retracting spring 36 in the form shown in Fig. 2 tends to displace the balanced parts within the valve downwardly or away from the valve inlet whereas in Fig. 3 the retracting spring tends to move the balanced parts upwardly or toward the inlet. It will be evident that some slight biasing force should be employed on the mechanism to bias it toward one position and in the arrangement shown in Fig. 2, the biasing force is used to insure contact between the parts 34 and 38. The arrangement shown in Fig. 3 tends to keep the stem 34 under tension when the valve is in operation and because of this the stem 34 and lost motion connection between it and the balancing member 28 may be replaced by a cable or other suitable non-rigid tension member.

In the embodiment illustrated in Fig. 4, valve casing 22 has reciprocably mounted in the inlet 23 thereof a sleeve 47 in which in turn is reciprocably mounted the valve member 26. As in the previously described forms, the valve member 26 is arranged to be opened by pressure of air admitted to the casing and opening movement of the valve member is opposed by the loading spring 27, the reaction of which is taken by the valve casing, against which the lower end of the spring abuts. The lower tubular portion 26d of the valve member is reciprocably mounted in a suitable guide 48 in the valve casing and at the lower end of portion 26d there is provided the nut 49 adapted to abut against a suitable stop 50 in the casing to limit upward movement of the valve member under the influence of the loading spring. The lower end of the valve casing is closed by a suitable cap 51 providing a guide 52 for the stem 34 which is connected to the sleeve 47 by suitable means such as the pin 53. The above described form of valve operates in a slightly different manner from that in which the previously described valves operate. The valve member is arranged to be opened by pressure of air admitted to the valve casing and opening movement of the valve is resisted by the loading spring, but in the present instance the reaction of the loading spring is absorbed by a fixed abutment provided by the valve casing rather than by an abutment on a movable balancing member. The amount of force required to open the valve is varied by altering the position of the sleeve 47 to alter the distance between the opening at the inner end of this sleeve and the abutment against which the loading spring reacts. By altering this distance it will be evident that the degree to which the loading spring must be compressed before the valve opens will be altered.

In the position shown in the figure, the loading spring 27 is under compression due to difference in pressure of air inside and outside the valve casing and the valve is exerting a throttling effect on the air admitted to the induction pipe. In order to increase the throttling effect, the stem 34 is pulled downwardly through the medium of the regulating mechanism and as a result greater force must be exerted on the valve member to further compress the loading spring in order to effect opening of the valve. Conversely if less throttling is desired, sleeve 47 is moved upwardly so that less compression of the loading spring is required before the valve is opened.

Still another form of valve, similar to the form shown in Fig. 4, is shown in Figs. 5 and 6. In the present arrangement, the valve member 26 is arranged to abut against a seat formed at the inner end of sleeve 47 instead of sliding in the sleeve. As in the form illustrated in Fig. 4, the loading spring 27 reacts against an abutment formed by the valve casing and the upward movement of the valve member is limited by the retaining nut 49 abutting against stop 50 on the casing. In the present form, however, an elastic connection is provided between the stem 34 and pin 53 which is secured to the sleeve 47. This elastic connection comprises a tube 54 pinned at its lower end to stem 34 by pin 55 and bifurcated at its upper end to provide a slot 56 in which the pin 53 is adapted to move. Pin 53 is connected to the stem 34 by means of a light tension spring 57 arranged within the tube 54 and tending to move pin 53 into contact with the stop 58 provided by the bottom of the slot 56. The operation of this form of the valve is in general similar to that of the form shown in Fig. 4 in that the closing force applied to the valve is derived from a loading spring acting against a fixed abutment, and regulation is effected by moving the sleeve 47, which is determinative of the position of the air inlet opening relative to the spring abutment. However, because of the fact that in the present form the valve member 26 abuts against the end of the sleeve 47, the elastic connection provided by spring 57 is required so that the closing force exerted by the loading spring 27 cannot be transmitted to the regulating mechanism.

In the position shown in the figure, the loading spring 27 is compressed to some extent by air pressure and the regulating mechanism is shown in a position of adjustment requiring a still greater force on the valve member in order to effect opening of the valve. If the suction in the induction pipe increases the valve member 26 will move downwardly, tending to move away from the sleeve 47, but due to the slight tension of the spring 57, the pin 53 and sleeve 47 will be pulled downwardly, following the downward movement of valve member 26 until pin 53 strikes the stop provided by the bottom of slot 56. After pin 53 strikes this stop, continued downward movement of valve member 26 due to increase in pressure difference on the two sides of the valve member will result in opening the valve. If the engine is stopped so as to establish equilibrium of air pressure on the valve member, the loading spring 27 will act as a retracting spring to move the valve member 26 upwardly until its motion is arrested by the nut 49, but, as previously pointed out, the closing force of the loading spring will not be transmitted to the regulating mechanism because of the interposition of the light spring 57 in the path of force transmission between the stem 34 and the sleeve 47.

In the forms of valve shown in Figs. 4 and 5, the regulating mechanism is subjected to a slight unbalanced force due to air pressure because of the unbalanced area represented by the cross-sectional area of the walls of sleeve 47, but as will be apparent from the drawings these walls may be made relatively thin so that the unbalanced area is very small and the resulting unbalanced force transmitted to the regulating mechanism is negligible from a practical operating standpoint.

Also, when these valves are employed as throttle valves in an arrangement such as that shown in Fig. 1, the fulcrum provided by rockshaft 17 should be disposed between the pump plunger and the stem 34, so that when arm 19 is moved to raise stem 34, thus adjusting the valve to give less throttling effect, the fingers 18 will move down to permit increased pump stroke.

When supplying combustion air to internal combustion engines, it is desirable to provide for unrestricted admission of air to the engine regardless of variations in engine speed, when the load on the engine is equal to or approaches full load. The valves hereinbefore described are arranged to provide for unthrottled air supply when the regulating mechanism is adjusted for high engine loads. Thus, in Fig. 2 if the stem 34 is lowered until the balancing piston 28 is in its lowest position of adjustment, the nut 30 at the top of the valve spindle will be at a level such that the valve member 26 will be sufficiently below the inlet opening to provide for unthrottled flow of air from the inlet to the outlet of the valve casing. Likewise in the form of valve shown in Fig. 3, the valve member 26 may be pulled far enough away from seat 39 to provide unthrottled air-flow, by adjusting the regulating mechanism so that the balancing member 28 is pulled downwardly far enough by stem 34 to take up the slack in the lost motion connection between member 28 and member 26 and pull the valve member away from its seat after the lost motion is taken up. In the forms of valves shown in Figs. 4 and 5 unthrottled air admission is effected by moving the sleeves 47, through the medium of the regulating mechanism, upward so that the lower ends of these sleeves are above the valve members 26 when the latter are in their uppermost positions as determined by the abutment of the nuts 49 against the stops 50.

From the foregoing description it will be evident that numerous changes and modifications may be made in the specific form of valve employed without departing from the spirit or scope of the invention which is to be considered as embracing all forms of apparatus falling within the scope of the appended claims when construed as broadly as is consistent with the state of the prior art.

What I claim is:

1. Charge-forming apparatus for internal combustion engines comprising a pump for supplying fuel to the engine, a valve for controlling flow of air to the engine for combustion with said fuel, said valve comprising a valve member arranged to be opened by the pressure of air controlled by the valve, a loading spring for closing the valve, regulating means adjustable to concomitantly determine the quantity of fuel delivered and the force required to open the valve and means for absorbing the reaction of the loading spring independently of the valve regulating means.

2. Charge-forming apparatus for internal combustion engines comprising a pump for supplying fuel to the engine, a valve for controlling flow of air to the engine for combustion with said fuel, said valve comprising a valve member arranged to be opened by the pressure of air controlled by the valve, a loading spring for closing the valve, means providing an abutment for absorbing the reaction of said loading spring and regulating means movable independently of the force exerted on said abutment by said spring for concomitantly determining the quantity of fuel delivered and the position of said valve member relative to said abutment for opening the valve.

3. Charge-forming apparatus for internal combustion engines comprising a pump for supplying fuel to the engine, a valve for controlling flow of air to the engine for combustion with said fuel, said valve comprising a valve member arranged to be opened by the pressure of air controlled by the valve, a loading spring for closing the valve, a movable balancing member subject to said pressure for absorbing the reaction of said loading spring and regulating means operatively connected with said pump and said balancing member for concomitantly determining the quantity of fuel delivered and the force required to open the valve.

4. Charge-forming apparatus for internal combustion engines comprising a pump for supplying fuel to the engine, a valve for controlling flow of air to the engine for combustion with said fuel, said valve comprising a reciprocable valve member arranged to be opened by pressure of air controlled by the valve, a loading spring for closing the valve, an abutment for absorbing the reaction of said loading spring and regulating means adjustable independently of the force transmitted to said abutment from said loading spring for concomitantly determining the quantity of fuel delivered and the stroke of said valve member required to open the valve.

5. Charge-forming apparatus for internal combustion engines comprising a pump for supplying fuel to the engine, a valve for controlling flow of air to the engine for combustion with said fuel, said valve comprising a casing having an inlet for air, a valve member arranged to be opened by pressure of air admitted through said inlet, said valve having an unbalanced area substantially equal to the area of said inlet, a loading spring for closing the valve, an abutment for absorbing the reaction of said loading spring and regulating means adjustable independently of the force transmitted to said abutment from said loading spring for concomitantly determining the quantity of fuel delivered and the force required to open said valve.

6. Charge-forming apparatus for internal combustion engines comprising a pump for supplying fuel to the engine, a valve for controlling flow of air to the engine for combustion with said fuel, said valve comprising a casing having an inlet for air, a reciprocable plate type valve member arranged to be opened by pressure of air admitted through said inlet, said valve having an unbalanced area substantially equal to the area of said inlet, a loading spring for closing the valve and an abutment for absorbing the reaction of said loading spring, and regulating means adjustable independently of the force transmitted to said abutment from said loading spring for concomitantly determining the quantity of fuel delivered and the force required to open the valve.

7. Charge-forming apparatus for internal combustion engines comprising a pump for supplying fuel to the engine, a valve for controlling flow of air to the engine for combustion with said fuel, said valve comprising a casing having an inlet and an outlet for air, a valve member arranged to be opened by pressure of air admitted through said inlet, a loading spring for closing said valve, an abutment for absorbing the reaction of said loading spring and regulating means adjustable independently of the force transmitted to said abutment from said spring for concomitantly determining the quantity of fuel delivered and the force required to open the valve, said loading spring being located within the casing and outside of the path for free flow of air from said inlet to said outlet.

8. Charge-forming apparatus for internal combustion engines comprising a pump for supplying fuel to the engine, a valve for controlling flow of air to the engine for combustion with said fuel, said valve comprising a casing, a reciprocable valve member in said casing arranged to be opened by pressure of air admitted to the casing, a reciprocable balancing member in said casing, a loading spring for closing said valve, said spring reacting against said balancing member whereby to secure balanced displacement of the valve member and the loading spring in the casing, and regulating means for concomitantly adjusting the position of said balancing member in the casing and determining the quantity of fuel delivered.

9. Charge-forming apparatus for internal combustion engines comprising a pump for supplying fuel to the engine, a valve for controlling flow of air to the engine for combustion with said fuel, said valve comprising a casing, a valve spindle in said casing, a valve member reciprocable with respect to said spindle, said valve member being arranged to be opened by pressure of air admitted to the valve, a loading spring for closing the valve, a reciprocable balancing member fixed with respect to said spindle, said spring reacting against said balancing member, and regulating means for concomitantly adjusting the position of said balancing member with respect to the casing and determining the quantity of fuel delivered.

10. Charge-forming apparatus for internal combustion engines comprising a pump for supplying fuel to the engine, a valve for controlling flow of air to the engine for combustion with said fuel, said valve comprising a casing, a valve spindle reciprocable in said casing, a valve member reciprocable on said spindle and arranged to be opened by pressure of air admitted to the casing, a balancing piston on said spindle, a loading spring between the valve and the balancing piston for closing the valve and regulating means for concomitantly determining the quantity of fuel and air admitted including an element operatively connected with said spindle for adjusting the position of the spindle in the casing.

11. Charge-forming apparatus for internal combustion engines comprising a pump for supplying fuel to the engine, a valve for controlling flow of air to the engine for combustion with said fuel, said valve comprising a casing having an inlet and an outlet for air, a valve spindle, a valve member reciprocable on said spindle and arranged to be opened by pressure of air admitted to the casing, a balancing member fixed to said spindle, a loading spring between said valve member and said balancing member, said balancing member and said spring being located outside of the path for free flow of air from said inlet to said outlet and regulating means for concomitantly determining the quantity of fuel and air admitted including an element operatively connected with said spindle for adjusting its position in said casing.

12. Charge-forming apparatus for internal combustion engines comprising a pump for supplying fuel to the engine, a valve for controlling flow of air to the engine for combustion with said fuel, said valve comprising a casing having an inlet and an outlet for air, a valve spindle reciprocable in the casing, a valve member reciprocable on said spindle and arranged to be opened by pressure of air admitted to the casing, said valve member having a closing portion for closing said inlet and a spring retaining portion spaced from said closing portion, a balancing piston on said spindle and reciprocable in said casing, said balancing piston and said spring retaining portion being located outside of the path for free flow of air from said inlet to said outlet, a loading spring between said balancing piston and said spring retaining portion, and regulating means for concomitantly determining the quantity of fuel and air admitted including an element operatively connected with said spindle for adjusting its position in said casing.

13. Charge-forming apparatus for internal combustion engines comprising a pump for supplying fuel to the engine, a valve for controlling flow of air to the engine for combustion with said fuel, said valve comprising a part providing an opening for admission of air, a valve member movable with respect to said opening for controlling flow of air therethrough, said valve member being arranged to be opened by the pressure of air admitted through said opening, a loading spring for closing said valve, an abutment for absorbing the reaction of said loading spring, and regulating means adjustable independently of the force transmitted to said abutment from said loading spring to alter the distance between said opening and said abutment and to determine the quantity of fuel delivered.

14. Charge-forming apparatus for internal combustion engines comprising a pump for supplying fuel to the engine, a valve for controlling flow of air to the engine for combustion with said fuel, said valve comprising a casing having an opening for admission of air, a reciprocable valve member in said casing, said valve member being arranged to be moved away from said opening to open the same due to pressure of air admitted through the opening, a loading spring for closing said valve, a reciprocable balancing member providing an abutment for absorbing the reaction of said loading spring, said balancing member being subject to said pressure and tending to move said loading spring toward said opening, and regulating means adjustable independently of the force transmitted to said abutment to determine the distance between said abutment and said opening and to determine the quantity of fuel delivered.

15. Charge-forming apparatus for internal combustion engines comprising a pump for supplying fuel to the engine, a valve for controlling flow of air to the engine for combustion with said fuel, said valve comprising a part providing an opening for admission of air, a reciprocable valve member arranged to be opened by pressure of air admitted through said opening, a loading spring for closing said valve, an abutment for absorbing the reaction of said loading spring and regulating means adjustable independently of the force exerted on said valve member by said loading spring for concomitantly determining the quantity of fuel delivered and adjusting the position of said part to determine the distance between said opening and said abutment.

16. Charge-forming apparatus for internal combustion engines comprising a pump for supplying fuel to the engine, a valve for controlling flow of air to the engine for combustion with said fuel, said valve comprising a casing, an annular part slidably mounted in said casing and providing an opening for admission of air thereto, a reciprocable valve member for controlling flow of air through said opening, said valve member being arranged to be opened by the pressure of air admitted to the casing, a loading spring for closing said valve, said casing providing a fixed abutment for absorbing the reaction of said loading spring, and regulating means movable independently of the force exerted by said loading spring on said valve member for concomitantly determining the quantity of fuel delivered and adjusting the position of said annular part and the opening provided thereby with respect to said abutment whereby to determine the force required to move said valve member away from said opening.

17. Charge-forming apparatus for internal combustion engines comprising a pump for supplying fuel to the engine, a valve for controlling flow of air to the engine for combustion with said fuel, said valve comprising a casing, a sleeve slidably mounted in said casing and providing an opening for admission of air to the casing, a reciprocable valve member arranged to slide in said sleeve and arranged to be moved away from said opening by pressure of air admitted to the casing, a loading spring for closing the valve, said casing providing an abutment for absorbing the reaction of said loading spring, and regulating means for concomitantly determining the quantity of fuel delivered and adjusting the position of said sleeve with respect to said abutment whereby to alter the position of said valve member relative to said abutment required to effect opening of the valve.

18. Charge-forming apparatus for internal combustion engines comprising a pump for supplying fuel to the engine, a valve for controlling flow of air to the engine for combustion with said fuel, said valve comprising a casing having an inlet for air, a reciprocable valve member arranged to be opened by the pressure of air admitted to said casing, a loading spring for closing the valve, a reciprocable member providing an abutment for absorbing the reaction of said loading spring, an expansible part connecting the last mentioned member and the casing to provide a balancing chamber open to pressure of air outside of the casing, said pressure acting in opposition to the reaction of the loading spring, and regulating means adjustable independently of the force exerted by said loading spring for concomitantly determining the quantity of fuel delivered and adjusting the position of said last mentioned member with respect to said inlet.

19. In an internal combustion engine, in combination, a pump for supplying fuel to the engine, a valve for controlling flow of air to the engine, said valve comprising a valve member arranged to be opened by the pressure of air controlled by the valve, regulating means operatively connected with said pump and said valve and adjustable to vary the force required to open the valve in accordance with variations in the amount of fuel supplied by the pump, a loading spring for closing the valve, and means for absorbing the reaction of the loading spring independently of said regulating means.

20. In an internal combustion engine, in combination, a pump for supplying fuel to the engine, a valve for controlling flow of air to the engine, said valve comprising a reciprocable valve member arranged to be opened by pressure of air controlled by the valve and a loading spring for closing the valve, a balancing piston for absorbing the reaction of said loading spring, and regulating means operable in response to movement of a single actuating member and comprising a part movable to vary the amount of fuel supplied by the pump and a part for moving said piston to vary the force required to open the valve, said piston acting to prevent transmission to said regulating mechanism of forces from said loading spring.

21. In an internal combustion engine, in combination, a pump for supplying fuel to the engine, a pressure responsive spring loaded air valve for controlling flow of air to the engine, regulating means for simultaneously determining the amount of fuel to be supplied by the pump and the force required to open the valve against its spring load and means for absorbing the reaction due to said spring load independently of the regulating means.

TORBJÖRN VIKTOR DILLSTRÖM.